United States Patent
Ang et al.

(10) Patent No.: US 11,825,410 B2
(45) Date of Patent: *Nov. 21, 2023

(54) SECONDARY CELL DORMANCY FOR NEW RADIO CARRIER AGGREGATION

(71) Applicant: QUALCOMM Incorporated, San Diego, CA (US)

(72) Inventors: Peter Pui Lok Ang, San Diego, CA (US); Gabi Sarkis, San Diego, CA (US); Peter Gaal, San Diego, CA (US); Wanshi Chen, San Diego, CA (US); Joseph Binamira Soriaga, San Diego, CA (US); Heechoon Lee, San Diego, CA (US); Seyedkianoush Hosseini, San Diego, CA (US); Huilin Xu, Temecula, CA (US); Wooseok Nam, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,585

(22) Filed: Dec. 13, 2022

(65) Prior Publication Data

US 2023/0112209 A1     Apr. 13, 2023

Related U.S. Application Data

(63) Continuation of application No. 16/739,035, filed on Jan. 9, 2020, now Pat. No. 11,558,814.
(Continued)

(51) Int. Cl.
*H04W 52/02* (2009.01)
*H04W 72/23* (2023.01)

(52) U.S. Cl.
CPC ....... *H04W 52/0206* (2013.01); *H04W 72/23* (2023.01)

(58) Field of Classification Search
CPC ... H04B 7/0695; H04B 7/0626; H04L 1/0026; H04L 5/0051; H04L 5/0094;
(Continued)

(56) References Cited

U.S. PATENT DOCUMENTS

| | | | |
|---|---|---|---|
| 2015/0215929 A1* | 7/2015 | Damnjanovic | H04W 56/001 370/241 |
| 2020/0052769 A1 | 2/2020 | Cirik et al. | |
| 2020/0229081 A1 | 7/2020 | Ang et al. | |

OTHER PUBLICATIONS

International Preliminary Report on Patentability—PCT/US2020/013184, The International Bureau of WIPO—Geneva, Switzerland, dated Jul. 22, 2021.
(Continued)

*Primary Examiner* — Dady Chery
(74) *Attorney, Agent, or Firm* — Procopio, Cory, Hargreaves & Savitch LLP

(57) ABSTRACT

A UE may enter a dormant state, e.g., for power savings. The systems, methods, and apparatus described herein may provide ways for the UE to transition between an active state and a dormant state, as well as UE behavior in a dormant state. The apparatus may be a UE configured to receive downlink control information (DCI) comprising an indication of a bandwidth part (BWP) switch for a secondary cell to a dormant BWP and transition the secondary cell from an active state to a dormant state based on the indication of the BWP switch of the secondary cell to a dormant BWP.

30 Claims, 13 Drawing Sheets

Related U.S. Application Data

(60) Provisional application No. 62/791,673, filed on Jan. 11, 2019.

(58) Field of Classification Search
CPC ..... H04L 5/0091; H04L 5/0023; H04L 5/001; H04L 5/0098; H04L 5/0048; H04W 74/0833; H04W 80/02; H04W 52/0206; H04W 72/042; H04W 16/08; H04W 48/12; H04W 72/0453; Y02D 30/70
See application file for complete search history.

(56) References Cited

OTHER PUBLICATIONS

International Search Report and Written Opinion—PCT/US2020/013184—ISA/EPO—dated Apr. 17, 2020.
LG Electronics: "Discussion on Power Saving for CA Operation", 3GPP Draft; R1-1812591 CA, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12-16, 2018, Nov. 11, 2018 (Nov. 11, 2018), XP051554535, 3 pages.
LG Electronics Inc: "Clearing Remaining Issues on BWP", 3GPP Draft, R2-1808511, Clearing Remaining Issues on BWP, 3rd Generation Partnership Project (3GPP), Mobile Competence Centre, 650, Route Des Lucioles, F-06921 Sophia-Antipolis Cedex, France, vol. RAN WG2, No. Busan, Korea, May 21-25, 2018, May 20, 2018 (May 20, 2018), XP051444778, 2 pages, the whole document.
Qualcomm Incorporated: "Open Issues on CA," 3GPP Draft; R1-1718581 Open Issues on CA, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9-13, 2017, Oct. 8, 2017, XP051341761, 10 pages, Retrieved from the Internet: URL: http://www.3gpp.org/ftp/Meetings_3GPP_SYNC/RAN1/Docs/ [retrieved on Oct. 8, 2017].
Qualcomm Inc: "Dormant BWP for Fast SCell Activation", 3GPP Draft, R2-1808570, 3GPP TSG-RAN WG2 Meeting #102, Dormant BWP for Fast SCell Activation, 3rd Generation Partnership Project (3GPP), Mobile Competence Centre, 650, Route Des Lucioles, F-06921 Sophia-Antipolis Cedex, France, vol. RAN WG2, No. Busan, Korea, May 21-25, 2018, May 20, 2018 (May 20, 2018), XP051444827, 5 pages, the whole document.
Taiwan Search Report—TW109100919—TIPO—dated Jul. 31, 2023.

* cited by examiner

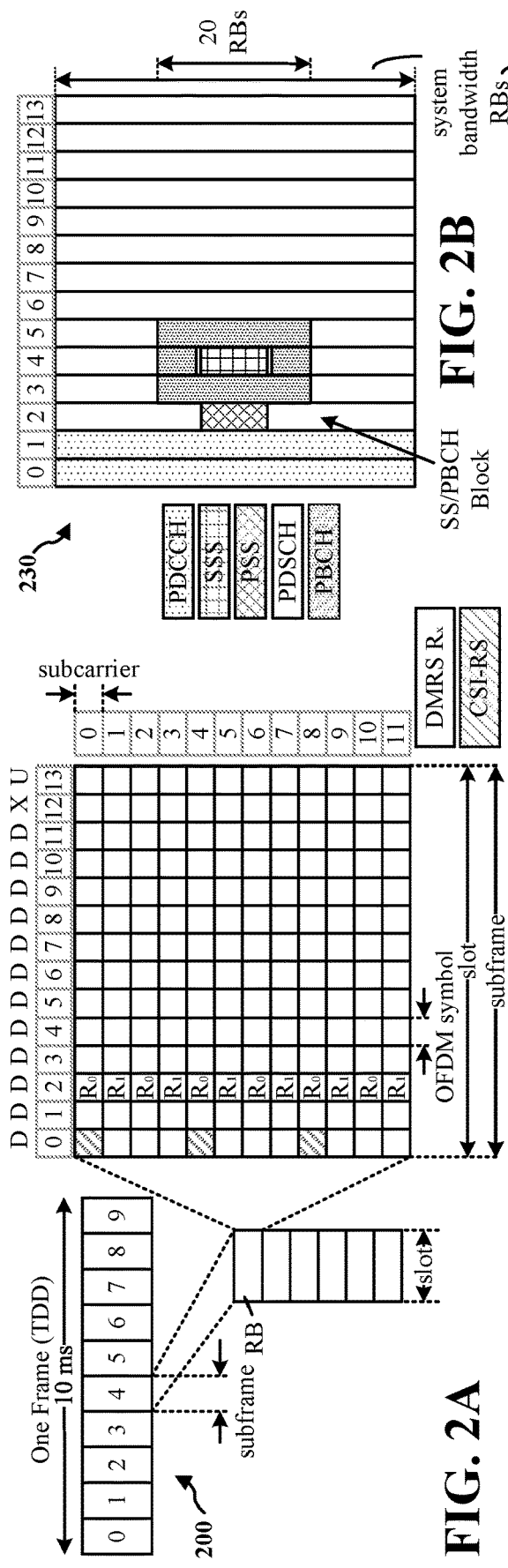
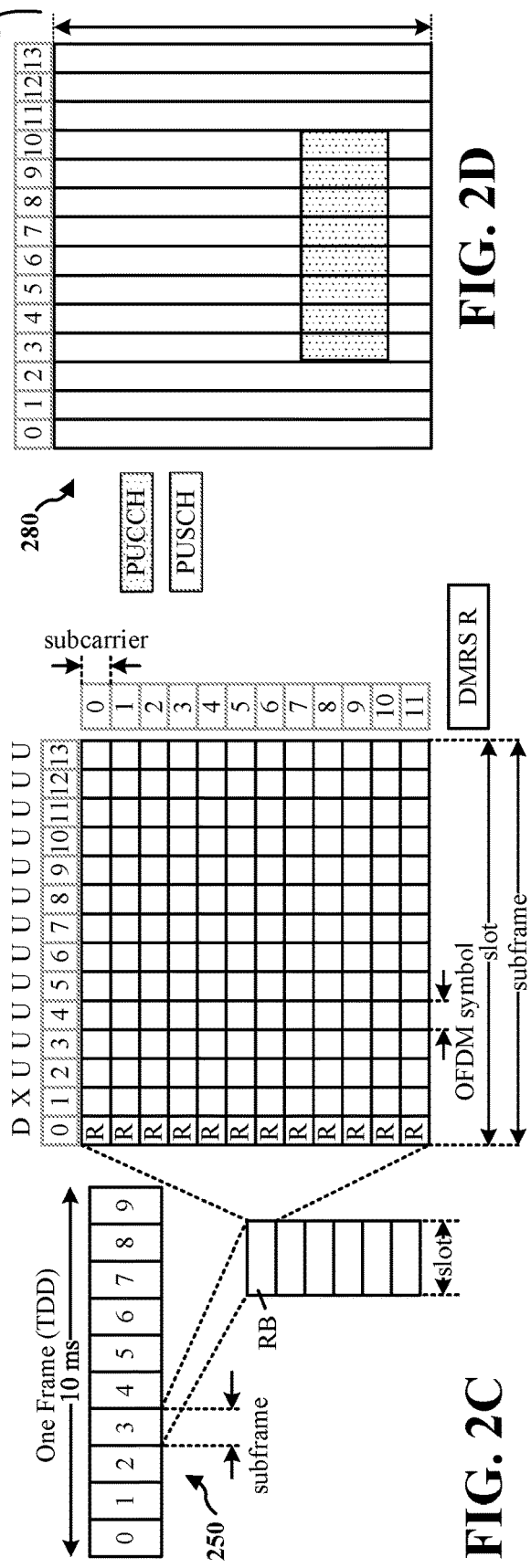

SECONDARY CELL DORMANCY FOR NEW RADIO CARRIER AGGREGATION

CROSS REFERENCE TO RELATED APPLICATION(S)

This application is a Continuation of U.S. Non-provisional application Ser. No. 16/739,035, entitled "SECONDARY CELL DORMANCY FOR NEW RADIO CARRIER AGGREGATION" and filed on Jan. 9, 2020, which claims the benefit of U.S. Provisional Application Ser. No. 62/791,673, entitled "Secondary Cell Dormancy For New Radio Carrier Aggregation" and filed on Jan. 11, 2019, which are expressly incorporated by reference herein in their entirety.

BACKGROUND

Technical Field

The present disclosure relates generally to communication systems, and more particularly, to communication systems that may include a dormant state.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some cases, a UE may not need to operate in an active state while at the same time, not be able to enter a deactivated state. Accordingly, an intermediate state between the activated state and the deactivated state has been proposed. Such a state may use less power than the activated state and thereby save energy because at times when the active state is not needed. The intermediate state between the activated state and the deactivated state may be referred to as a dormant state. The dormant state may perform fewer and/or different functions than the active state, while also being different than the deactivated state. Accordingly, the dormant state may define some UE behavior and/or have particular properties. The UE behavior or properties of the dormant state may allow for power savings. Introduction of the deactivated state may require a definition of behaviors or properties for such a state. Furthermore, introduction of the deactivated state may require mechanisms for transitioning between an active state and a dormant state. Some systems and methods described herein may define the UE behavior, properties, or both. Other systems and methods described herein may relate to transitioning between an active state and a dormant state. Various systems and methods described herein may relate to both define the UE behavior and/or properties, and transitioning between an active state and a dormant state.

In an aspect of the disclosure, a method, a computer-readable medium, and an apparatus are provided for wireless communication at a user equipment (UE). The apparatus may be configured to receive an indication of a bandwidth part (BWP) switch for a secondary cell and to transition between an active state and a dormant state for the secondary cell based on the indication of the BWP switch.

In another aspect of the disclosure, a method, a computer-readable medium, and an apparatus are provided for wireless communication at a base station. The apparatus may be configured to determine to transition a UE between an active state and a dormant state for a secondary cell and to transmit, to the UE, an indication of a BWP switch for the secondary cell in order to transition the UE between the active state and the dormant state for the secondary cell.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
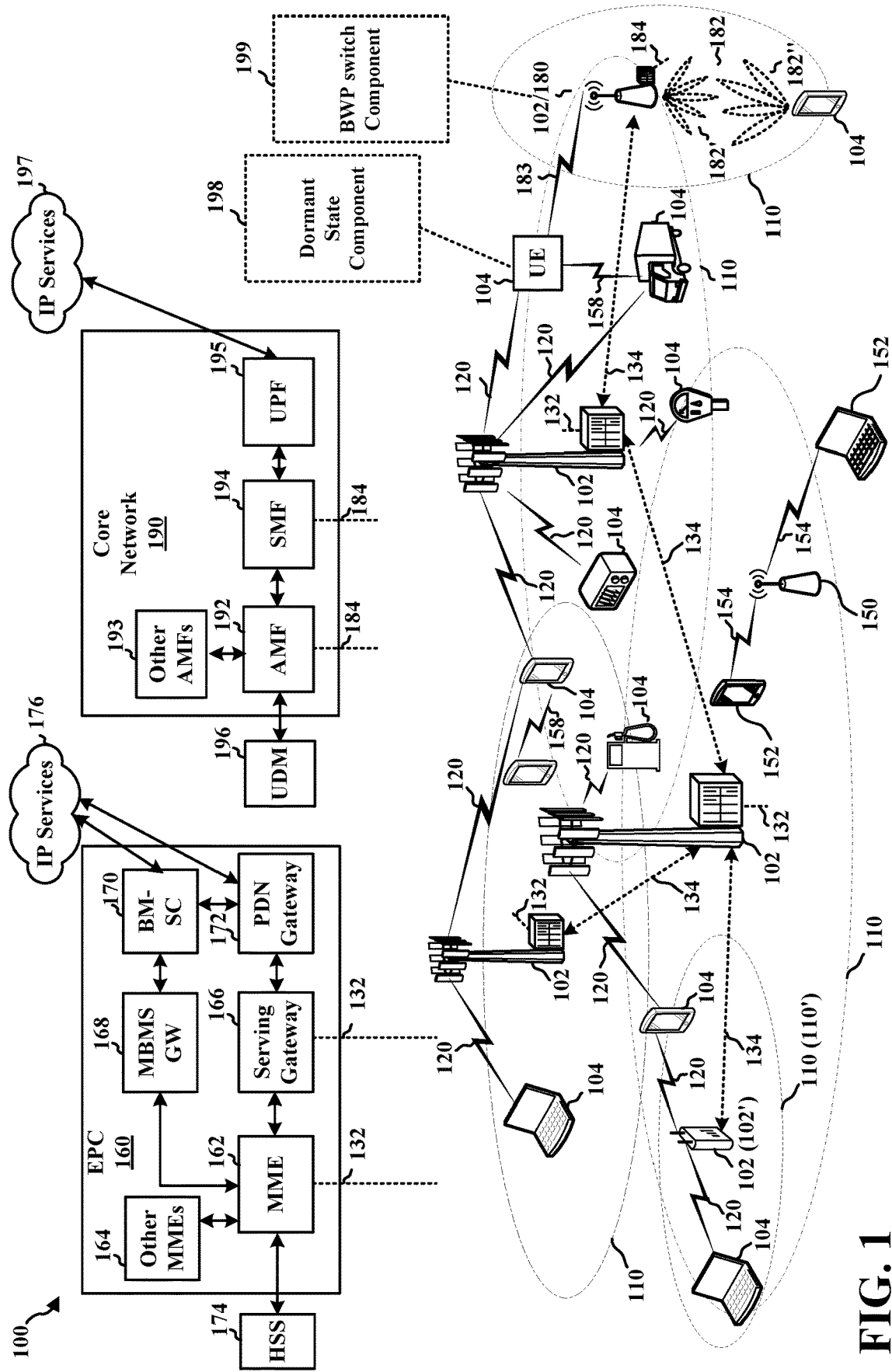
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 to send or receive a signal 183 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may optionally comprise a dormant state component 198 that is configured to transition between a dormant state and an active state, as described herein. The UE may monitor a primary cell or a secondary cell for an indication to enter or exit the dormant state. The UE may monitor for a bandwidth part (BWP) switching downlink control information (DCI) and/or may monitor for other signaling to indicate a transition to/from the dormant state. The base station 102 or 180 may include a BWP switch component 199 that is configured to transmit, to the UE 104, an indication of a BWP switch for the secondary cell in order to transition the UE between the active state and the dormant state for the secondary cell. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
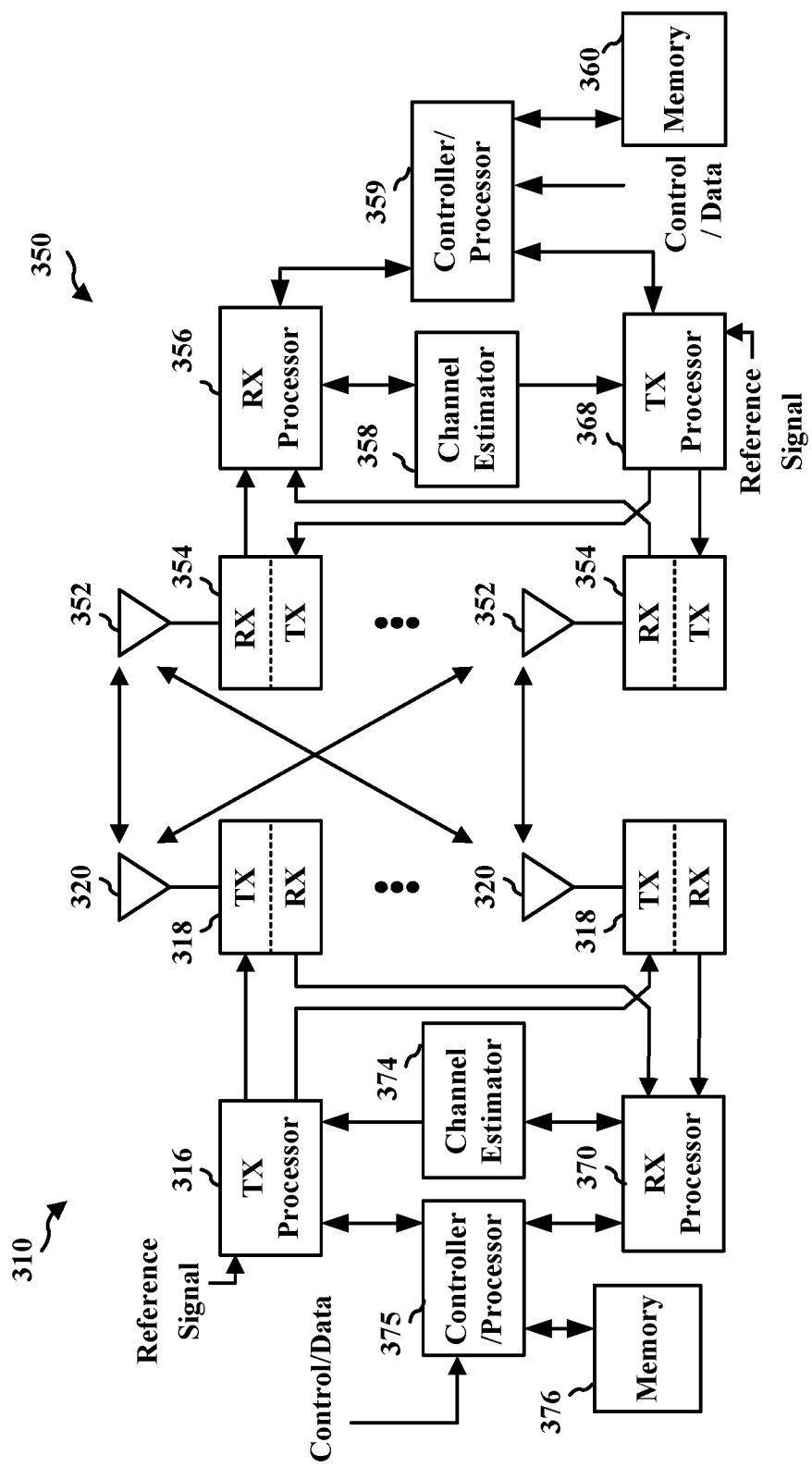
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
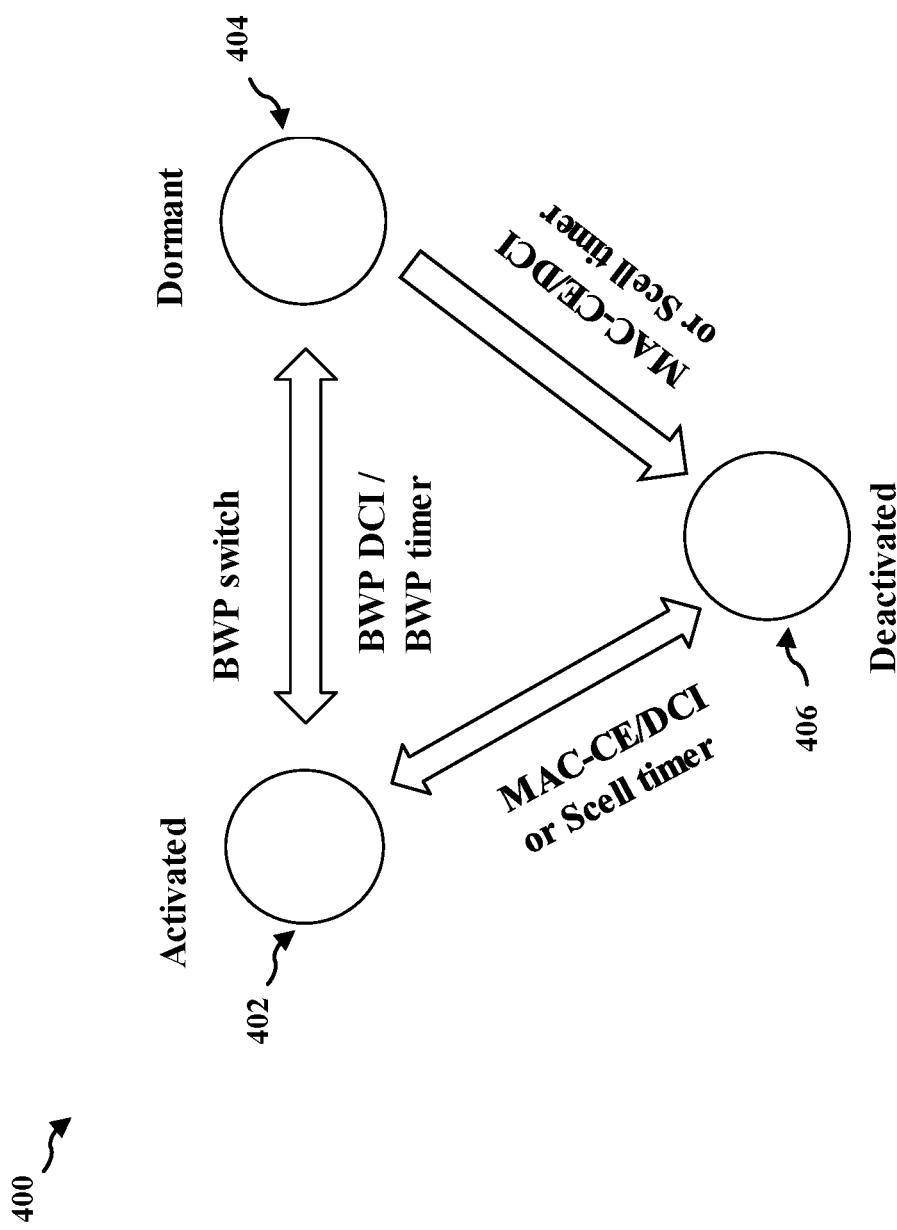
FIG. 4 is a state diagram illustrating an active state, a dormant state, and a deactivated state.

FIG. 4 is a state diagram 400 for a SCell illustrating an active state 402, a dormant state 404, and a deactivated state 406. The SCell may comprise a mmW cell, a shared spectrum cell, etc. Signaling for the SCell may be received on a primary cell. The SCell may use a different frequency range or frequency band than the primary cell. A UE may switch between the active state 402 and the dormant state 404 based on any of a number of mechanisms. For example, the UE may enter/exit the dormant state based on a BWP switch, e.g., a BWP switch for the SCell or for another cell, such as a Primary Cell (PCell) or a Primary Secondary cell-group cell (PSCell). A PCell is a cell that belongs to a master cell group (MCG). A PSCell is one of the cells that belong to a secondary cell group (SCG). The MCG may be associated with a master RAN node and may include the PCell and one or more secondary cells (SCells). The SCG may be associated with a secondary RAN node and may include the PSCell and one or more secondary secondary cells (SSCells). In other aspects, the UE may enter/exit the dormant state for the SCell based on explicit signaling such as a DCI or MAC-CE. In other aspects, the UE may enter/exit the dormant state based on a timer, such as an inactivity timer or a BWP timer. The UE may switch between the active state 402 and the deactivated state 406 based on a MAC-CE/DCI or a SCell timer. The UE may switch to the deactivated state 406 from the dormant state 404 based on a MAC-CE/DCI or a SCell timer.

The deactivated state 406 may provide for SCell power saving relative to the activated state 402. The deactivated state 406 may be used to decrease power consumption relative to the activated state 402 during times when switching to the dormant state 404 is not possible. For example, the UE may transition to a dormant state 404 in which the UE still performs a reduced set of functions without being deactivated. The dormant state may include skipped or reduced PDCCH monitoring and/or sparser periodicity for CSI measurements, beam management, etc. relative to the active state. In a deactivated state, the UE may skip additional measurements or functions. For example, in the deactivated state, the UE may not perform CSI measurements or beam management functions, whereas the UE may perform reduced/sparser measurements or beam management in the dormant state. Thus, the dormant state may include a reduced set of monitoring functions and/or monitoring functions at reduced levels/rates/states relative to the activated state, which are not performed in the deactivated state. Aspects described herein relate to UE behavior and properties of the dormant state 404. Accordingly, examples of reduced functions that the UE may perform in the dormant state 404 are discussed in greater detail below. Additionally, aspects presented herein provide examples for the transition between activated state 402 and dormant state 404 in FIG. 4.

In an aspect, the UE may skip PDCCH monitoring of the SCell when in the dormant state 404. Accordingly, the UE may avoid using power that would be used on the active state 402 for PDCCH monitoring of the SCell. The UE may be able to skip PDCCH monitoring of the SCell because the UE does not expect to be scheduled on the SCell and therefore does not need to monitor the PDCCH of the SCell that it does not expect to be scheduled on. In other aspects, the UE may continue to perform PDCCH monitoring, but may perform the monitoring in a reduced manner in comparison to the active state. The reduced PDCCH monitoring may be aligned, e.g., with CSI measurements.

In an aspect, the UE may perform CSI measurements and/or SRS transmission for the SCell at a more sparse periodicity in comparison to the active state, e.g., with a longer period length between CSI measurements and/or SRS transmissions.

The dormant state may have a reduced Radio Resource Management (RRM) configuration. The measurement duration and/or periodicity for RRM may be relaxed in comparison to the active state.

The UE may continue to perform beam management in a reduced manner, e.g., based on the reduced CSI measurements. Furthermore, as beam failure occurs while in the dormant state, beam failure recovery may be performed through the PCell. As the UE may continue to perform reduced CSI measurement, reduced beam management, and/or reduced PDCCH monitoring, the UE may transition from the dormant state 404 to the activated state 402 more quickly.

In an aspect, the BWP framework may be used as a configuration and/or signaling mechanism to support transitioning in and out of the dormant state. A BWP switch may indicate to the UE to transition between the active state and the dormant state. The dormant state may be associated with a particular BWP of the PCell and/or of the SCell, e.g., a dormant BWP. For example, a UE may monitor the SCell for a BWP switching DCI. The DCI may be referred to by other names than "BWP switching DCI." A BWP switching DCI may refer to a DCI that includes an indication of a BWP switch for the UE. The UE may receive an indication on a primary cell or a SCell and may transition between an active state and a dormant state for the SCell based on the indication of the primary cell or of the secondary cell. Using the BWP framework as a configuration and signaling mechanism to support transitioning in and out of dormancy state may help to target traffic variations in smaller time scale.

In an aspect, a UE may reduce the activation/deactivation latency such that SCells may be activated and deactivated more quickly and frequently to adapt to traffic load variations by using DCI-based signaling when MAC-CE signaling becomes a significant portion of the timeline. The technique of fast SCell activation and/or deactivation may target traffic variations having a larger time scale.

Figure 5:
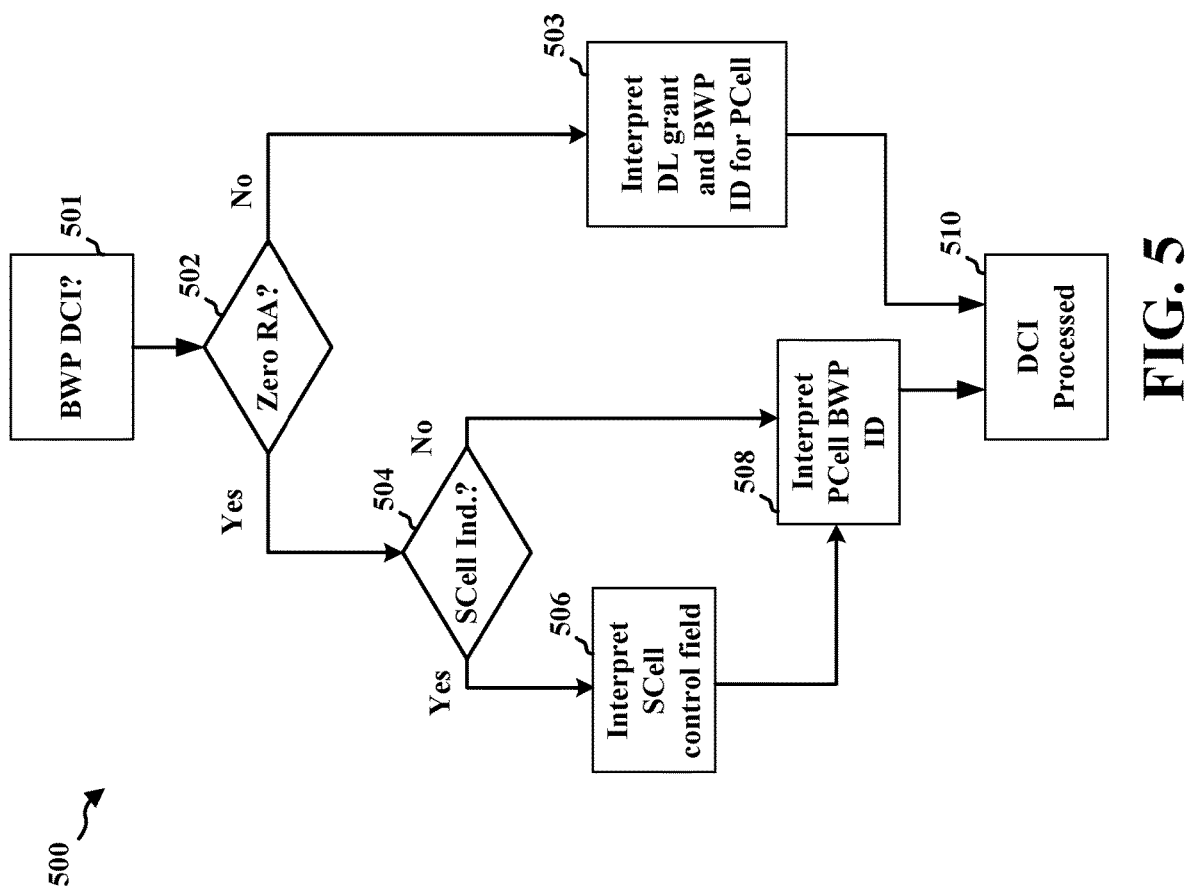
FIG. 5 is a flowchart illustrating a signaling mechanism to put a secondary cell (SCell) in and out of dormant BWP using downlink control information (DCI) signaling.

FIG. 5 is a flowchart 500 illustrating a signaling mechanism to put an SCell in and out of dormant BWP using DCI signaling. For SCell dormancy based on BWP signaling, the signaling for a transition to and/or from the SCell dormant state may be based on the BWP framework. A BWP DCI may be received, at 501. The UE may determine whether there is a valid resource allocation in the DCI, at 502. If the DCI includes a valid resource assignment, the UE may interpret the downlink grant and BWP ID, e.g., for a PCell, at 503. If a valid resource allocation is not included, such as if an invalid or a zero resource allocation is included, at 504, the UE may determine whether the SCell is indicated. An invalid resource allocation or a zero resource allocation may be referred to as a "null assignment." An example of a zero resource allocation may include a resource allocation set to all zeros. An example of an invalid resource allocation may include a resource allocation field is set to all ones when Type 1 resource allocation is used for the UE. If so, the DCI may be interpreted, at 506, as an indication to switch to/from the dormant state for the SCell. If the SCell is not indicated, the UE may interpret the DCI to switch the BWP for the PCell, at 508. Thus, the DCI assignment may comprise a null assignment on the PCell to indicate the switch to the dormant state for the SCell. At 510, the DCI may be processed according to the determination made at 503, 506, or 508.

During periods of low traffic activity, activated SCell(s) may have the active BWP switched to a dormant BWP. A dormant BWP may be associated with a state when a UE is not active or is less active, e.g., a state when the UE does not use bandwidth, or minimally schedules use of bandwidth. The UE may continue monitoring DL control channel on the PCell, but may skip DL control channel monitoring or reduce DL control channel monitoring on at least one SCell. The actual signaling mechanism to put the SCell(s) in and out of the dormant state, e.g., switching between an active BWP and a dormant BWP, may be accomplished in a number of ways.

Figure 6:
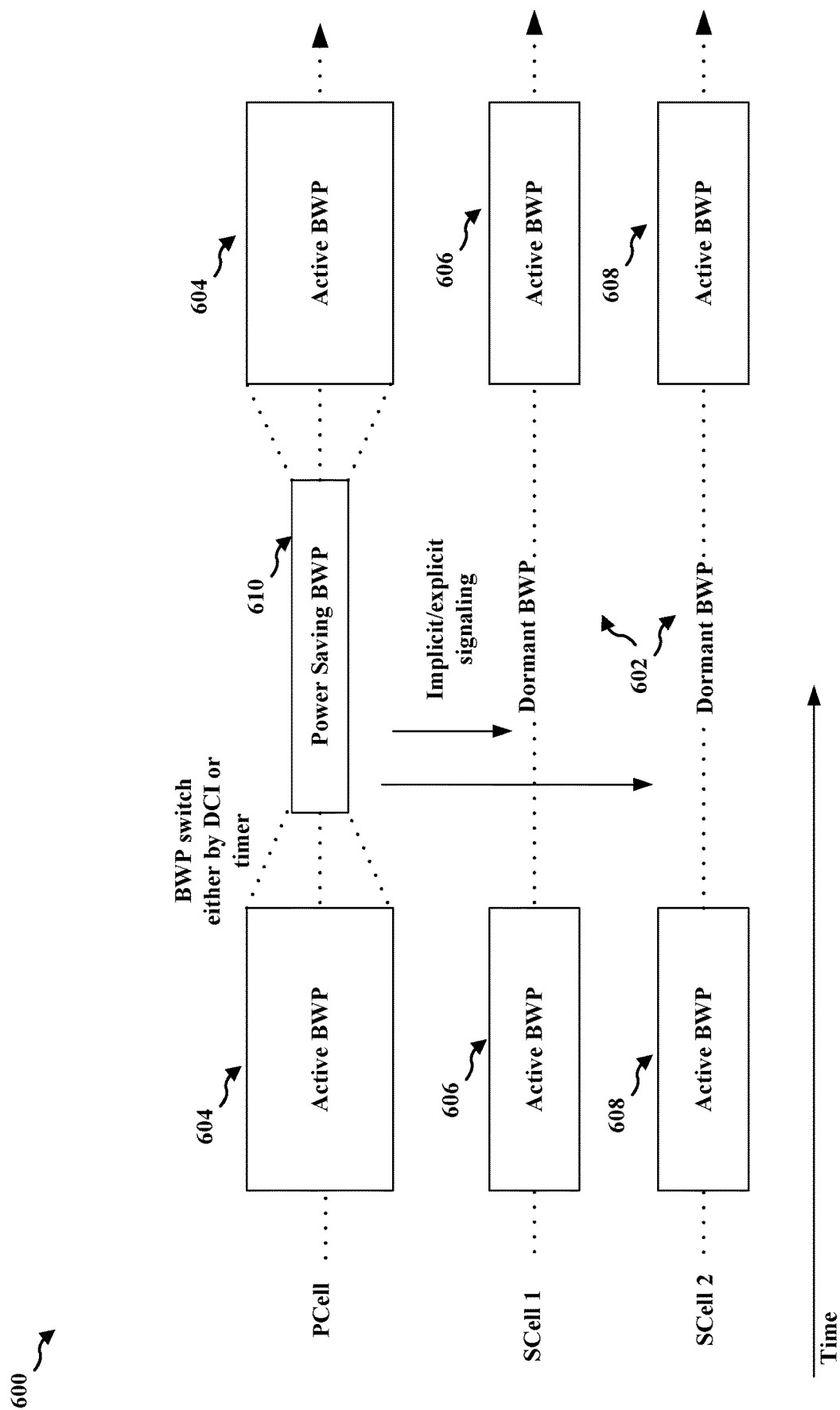
FIG. 6 is a diagram illustrating a signaling mechanism to put a secondary cell (SCell) in and out of dormant BWP base on a PCell's active BWP status.

In some aspects, the SCell may transition between the dormant state and the active state based on the BWP status of the primary cell (e.g., PCell or PSCell). FIG. 6 is a diagram 600 illustrating a signaling mechanism to put a SCell (SCell1, SCell2) in and out of dormant state in an implicit manner based on a PCell's active BWP status. For SCell dormancy that is based on BWP signaling, the signaling for a transition to and/or from the SCell dormant state may be based on the BWP framework. FIG. 6 illustrates a PCell that is initially configured for an active BWP 604. At the same time, SCell 1 and SCell 2 use active BWPs 606, 608. At a second point in time, the PCell may switch to a second BWP 610, e.g., a power saving BWP. The switch may be based on signaling, such as DCI/MAC-CE, or may be based on a timer, such as an inactivity timer. Based on the BWP switch of the PCell, at least one SCell may transition to a dormant state. FIG. 6 illustrates two SCells (SCell 1 and SCell 2) transitioning to the dormant state based on the BWP switch of the PCell. Alternatively, the BWP may cause a single SCell to transition to the dormant state and/or a subset of SCells to transition to the dormant state. For example, a subset of SCells may be configured to switch to a dormant state based on a BWP of the PCell. Other SCells might not be configured to switch to the dormant state in this manner.

The dormant state may correspond to a particular BWP for the SCell, e.g., a dormant BWP 602, as shown in FIG. 6. Alternatively, the dormant state may be applied for any BWP that is active for the SCell. When the PCell switches BWP, e.g., returning to active BWP 604, or to another BWP, the SCell(s) may exit the dormant state and return to an active state.

During periods of low traffic activity, activated SCell(s) may have the SCells active BWP switched to the "dormant BWP." The UE may continue monitoring DL control channel on the PCell, but may skip or reduce monitoring on the SCell(s).

FIG. 6 illustrates another example for transitioning a UE between an active state and a dormant state based on a PCell's active BWP.

A BWP in PCell may be designated as the "power saving BWP." The BWP may be the default BWP. Additionally, in an aspect, rather than having a selection of power saving at the PCell result in a dormant state for all of the SCells, different cells may be configurable. For example, SCells may transition individually (or in smaller groups) to the dormant state, rather than all SCells transitioning to the dormant state.

SCell Dormancy may be associated with a particular BWP, e.g., a dormant BWP. The dormant BWP may be a DL/UL BWP pair. Thus, when the dormant BWP becomes active, the SCell may transition to the dormant state. The dormant BWP may be configured to have no PDCCH monitoring or to have reduced PDCCH monitoring. For example, the dormant BWP may be configured based on an empty CORESET, an empty search space, an empty set of candidates in a search space, etc. The dormant BWP may comprise the full bandwidth of the SCell. In other aspects, the dormant BWP may comprise a partial bandwidth of the SCell. CSI measurement and/or SRS transmission may be configured for the dormant BWP to have a larger, e.g., more sparse, periodicity in comparison to a BWP for the active state of the SCell. RRM can be reduced implicitly based on the reduced CSI measurements, e.g., at least for CSI-RS based RRM. As described in connection with FIG. 6, the SCell may switch to the dormant BWP based on a BWP of the PCell. Thus, the UE may monitor for a BWP switching DCI on the PCell. Alternatively or additionally, the UE may monitor for a BWP switching DCI on the SCell.

In another example, the dormant state of the SCell may be a sub-state of the BWP of the SCell. Thus, the BWP of the SCell may be used for an active state and may also be used for the dormant state. A first set of parameters may be applied for the BWP in the active state, and a second set of parameters may be applied to the BWP in the dormant state. For example, in the active state, the UE may monitor for PDCCH on the BWP. In the dormant state, the UE may skip monitoring for PDCCH on the BWP or may monitor for PDCCH in a reduced manner on the BWP. Similarly, in the dormant state, the UE may reduce CSI measurement and/or SRS transmission on the BWP relative to CSI measurement/SRS transmission in the active state. The UE may be configured to apply a scaling factor for to the CSI/SRS periodicity for the BWP when the UE is in the dormant state.

In another example, the dormant state may be applied for a CC rather than a BWP. The UE may apply a set of parameters (skipped or reduced PDCCH monitoring/reduced CSI/SRS) to the CC in the dormant state. The UE may be configured to apply a scaling factor for to the CSI/SRS periodicity for the CC when the UE is in the dormant state.

As the dormant state may be a sub-state of a BWP or CC, additional signaling may be used to control entry/exit of the dormant state. For example, the UE may receive explicit signaling to enter the dormant state, such as a DCI or MAC-CE. The DCI/MAC-CE may be received on the PCell. For example, if the UE is in the dormant state and is not monitoring PDCCH, the UE may receive the DCI/MAC-CE on the PCell in order to know to exit the dormant state. In other examples, the UE may receive the DCI/MAC-CE on the SCell. For example, the UE may receive DCI/MAC-CE on the SCell that causes the UE to enter the dormant state. Furthermore, if the UE is performing reduced PDCCH monitoring on the SCell in the dormant state, the UE may receive the DCI/MAC-CE on the SCell to cause the UE to exit the dormant state.

In other aspects, the UE may transition to the dormant state based on a timer, rather than based on signaling. The timer may comprise an inactivity timer.

In other aspects, the UE may transition between the dormant state and the active state based on implicit signaling. For example, the dormant state may be associated with a Discontinuous Reception (DRX) state. Thus, the SCell may be in the dormant state during a DRX on duration. In another example, the UE may use an inference based on another configuration/other signaling to determine to transition between the active state and the dormant state. For example, if the search space(s) for the SCell are disabled, e.g., by semi-persistent search space configuration, the UE may infer the SCell to be in a dormant state.

In other aspects, the UE may use a combination of explicit signaling, implicit signaling, and/or timer-based mechanisms to determine when to transition between the active state and the dormant state.

Figure 7:
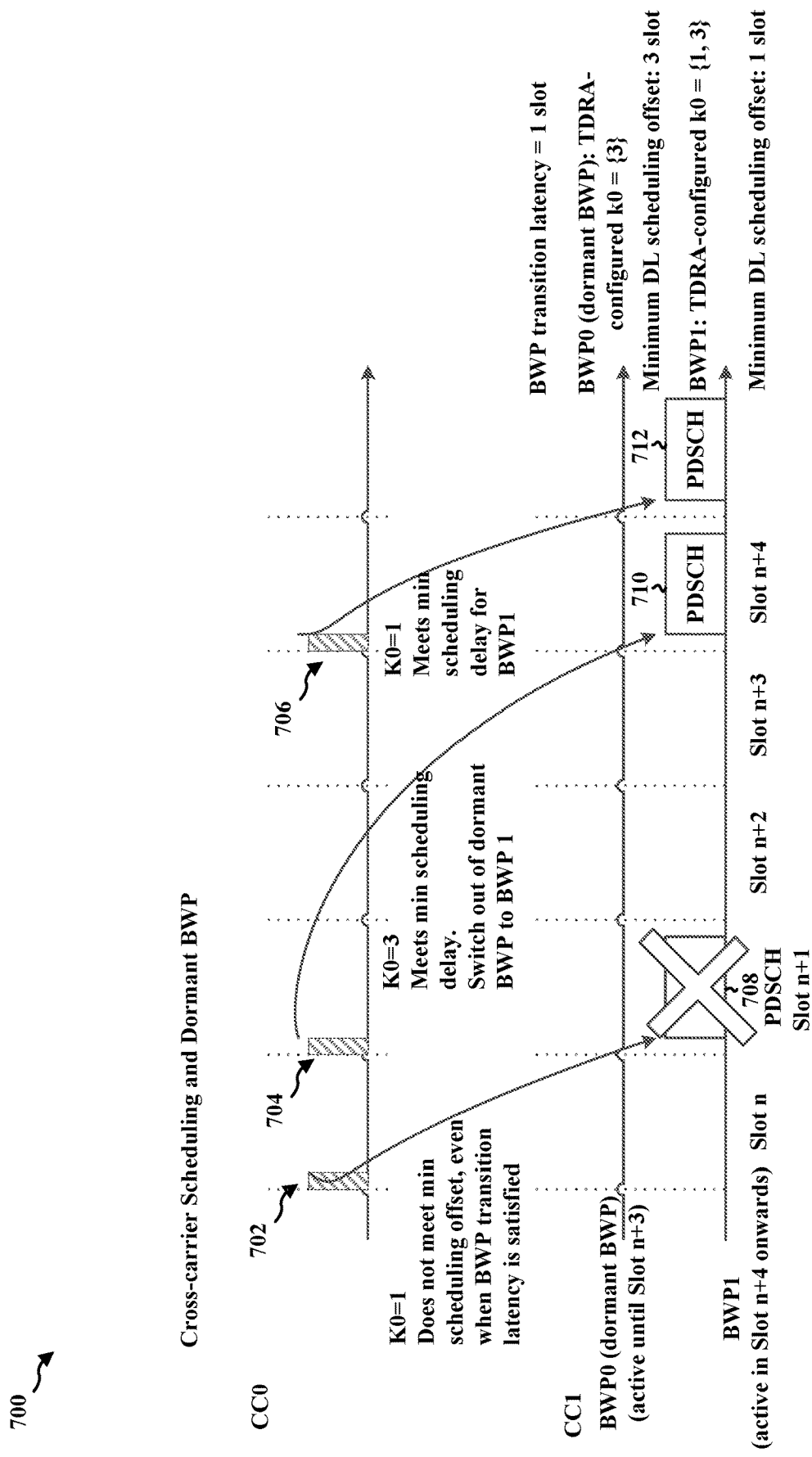
FIG. 7 is a diagram illustrating scheduling and dormant BWPs.

FIG. 7 is a diagram 700 illustrating cross-carrier scheduling with respect to dormant BWPs. SCell dormancy may be applied to an SCell that is either self-scheduled or cross-carrier scheduled. In cross-carrier scheduling, resources for one component carrier (CC) may be scheduled by a control signaling (e.g., a PDCCH) that is transmitted on a different CC. In self-scheduling, a grant is transmitted on the same CC as the resources being scheduled. FIG. 7, illustrates an example for cross-carrier scheduling.

When an SCell is cross-carrier scheduled, because PDCCH monitoring may be done on the PCell, the main power saving motivation might not be to stop PDCCH monitoring for SCell completely. For example, stopping SCell PDCCH monitoring may not result in a power savings or as large a power savings as when stopping of the SCell PDCCH monitoring is performed with self-scheduling.

For cross-carrier scheduling, SCell dormancy may affect other operations taking place on the SCell such as CSI/SRS, RRM, or beam management (BM) to save power. As described above, CSI/SRS, RRM, and/or BM may be performed in a sparser manner in the dormant state. Cross-carrier scheduling without SCell dormancy may achieve power saving without stopping SCell PDCCH monitoring, especially with non-zero minimum scheduling offset. Cross-carrier scheduling with SCell dormancy may achieve further power saving as compared to cross-carrier scheduling without SCell dormancy.

When a UE is configured for cross-carrier scheduling, SCell PDCCH monitoring may not be completely disabled for the dormant state because the UE perform the monitoring on the PCell. For example, the UE may continue to perform SCell PDCCH monitoring on the PCell while in the dormant state. The SCell PDCCH monitoring may be performed along with the PDCCH monitoring for PCell.

SCell PDCCH monitoring on the PCell may be performed at a higher periodicity and at a reduced rate, corresponding to a possible reduction in CSI/SRS/RRM/BM configuration(s) for the SCell dormant state. In other words, the UE may monitor the PCell for SCell PDCCH less frequently while in a dormant state.

In examples involving explicit signaling, the UE may use cross-carrier scheduling DCI to switch the SCell into and/or out of the dormant BWP or a dormant state on an active BWP. In some aspects, the UE may not expect data to be scheduled on the SCell when the SCell is in the dormant state. Rather than scheduling data for the SCell, the DCI for switching BWP or for switching states of an active BWP or CC, may contain a null-assignment (e.g., without scheduling data).

When an SCell is in dormant state (e.g., the dormant BWP is "active"), a larger latency may be involved to transition to the active state, e.g., to receive/transmit data or other communication on the SCell. The larger latency may be supported by configuring a large enough minimum scheduling offset for a dormant BWP or a dormant state of an active BWP/CC.

When the SCell is in the activated state, the minimum scheduling offset may become smaller for lower latency data scheduling. In the case when the SCell is in the activated state, the active BWP (e.g., a BWP that is not a dormant BWP) of SCell may be configured with small minimum scheduling offset.

In addition to the already mentioned dormant BWP configuration (e.g., which may have sparse PDCCH monitoring periodicity, reduced CSI/SRS, and other reduced or modified functionality as described herein), a large minimum scheduling offset (including large minimum k0 in TDRA configuration) may be configured. TDRA (Time Domain Resource Allocation) may be a table that may be configured as a PDSCH Time Domain Allocation List and PUSCH Time Domain Allocation List for PDSCH and PUSCH scheduling, respectively. For example, the PDSCH Time Domain Allocation List may define the possible options for k0 and other PDSCH scheduling parameters, and the option may be selected by an indication in the scheduling DCI.

FIG. 7 illustrates an example of cross-carrier scheduling with scheduling on CC0. A BWP transition latency may correspond to 1 slot. A dormant BWP (or dormant state for an active BWP) may have an increased transition latency of 3 slots. The UE may use the 3 slots to transition from the dormant BWP, e.g., BWP0, to an active BWP, e.g., BWP1. Thus, a minimum DL scheduling offset of 3 slots may be provided between receiving PDCCH and being ready to receive PDSCH on BWP1. FIG. 7 illustrates, at 702, that a first PDCCH with K0=1 does not meet the minimum scheduling offset of 3 slots. Accordingly, a UE using cross-carrier scheduling at K0=1 may remain in the dormant state, e.g., BWP0, rather than switching to BWP1. Thus, the UE may skip monitoring for the PDSCH at slot n+1 (708) on BWP1. At 704, the second PDCCH corresponds to an offset of K0=3. As the timing at 704 meets the minimum scheduling offset, the UE may switch out of the dormant state BWP0 to the active BWP1 in order to monitor for the PDSCH at slot n+4 (710). The PDSCHs after slot n+4 may be monitored, e.g., until a switch back to a dormant state. At 706, K0=1, although this offset would be too small for the BWP switch from BWP0 to BWP1, the UE is already on BWP1, which may have a minimum offset of a single slot. Thus, the timing may meet the scheduling delay, m, for BWP1, and the UE may monitor for the PDSCH at 712.

As illustrated in FIG. 7, the BWP transition latency for an active slot may be smaller than the BWP transition latency for a dormant BWP. In the example of FIG. 7, the transition latency for an active BWP equals 1 slot, and for BWP0 (dormant BWP), the TDRA-configured k0={3} and the Minimum DL scheduling offset is 3 slots. The BWP1 TDRA-configured k0 {1, 3} and the Minimum DL scheduling offset is 1 slot.

In an aspect, the SCell may be cross-carrier scheduled using the PCell. In one example, when cross-carrier scheduling is used, the dormant state for the SCell may include a configuration for at least one of: an increased control channel monitoring period for the SCell on the PCell relative to the active state, an increased Channel State Information (CSI) measurement period for the SCell relative to the active state, an increased Sounding Reference Signal (SRS) transmission period for the SCell relative to the active state, a reduction in a Radio Resource Management (RRM) measurement or duration relative to the active state, beam management performance based on the increased CSI measurement period relative to the active state, beam failure recovery performance through the primary cell, or an increased minimum scheduling offset relative to the active state. In other examples, the dormant state for the SCell may include other features described herein. By reducing the amount of functions performed by the UE due to the longer periods between measurements, beam management functions, etc., the power consumption of the UE may be reduced.

In an aspect, the indication may include DCI received from the primary cell that includes an indication to cause the UE to transition between the active state and the dormant state for the SCell. In such an aspect, the DCI may comprise a null assignment.

Figure 8:
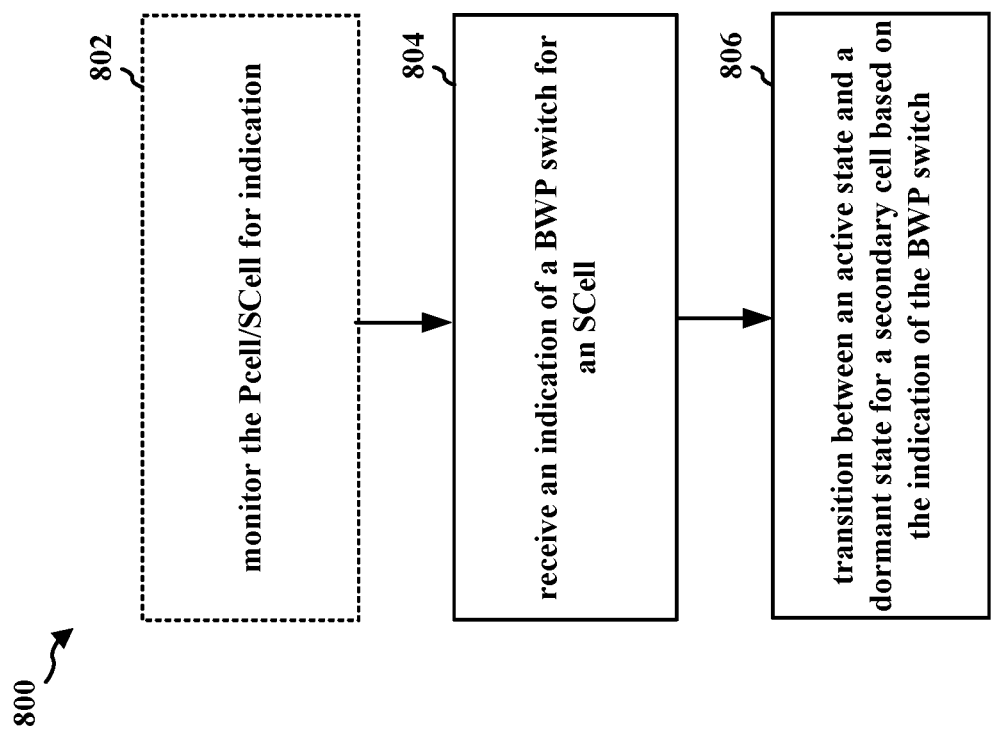
FIG. 8 is a flowchart of a method of wireless communication.

FIG. 8 is a flowchart 800 of a method of wireless communication. The method may be performed by a UE or a component of a UE (e.g., the UE 104, 350, the apparatus 902/902') that is in communication with a primary cell (e.g., a PCell or PSCell) and at least one SCell. Optional Aspects are illustrated with a dashed line. The method may enable the UE to achieve greater efficiency and improved power savings by transitioning to a dormant state. Aspects of the method may enable the UE to transition between the active state and the dormant state in an improved manner.

At 802, the UE may monitor a primary cell (e.g., PCell or PSCell) or a secondary cell for an indication for the UE to transition an SCell to a dormant state. The monitoring may be performed, e.g., by the reception component 904 of the apparatus 902 in FIG. 9. For example, the UE may monitor the primary cell for a DCI that indicates a BWP switch. Alternatively or additionally, the UE may monitor the SCell for a DCI that indicates a BWP switch. The UE may also monitor for DCI/MAC-CE that is independent of BWP and that may be used by the UE to determine to transition to the dormant state. For example, the UE may look for a received indication, receive such an indication from the means for receiving an indication on a primary cell or a SCell, and pass such an indication to a transition component for further processing.

At 804, the UE receives an indication of a BWP switch for an SCell. In an aspect, the indication may include an indication of a BWP switch of the SCell, and the UE may transition at least one SCell from the active state to the dormant state based on the BWP switch. The reception may be performed, e.g., by the BWP switch component 906 and/or the reception component 904 of the apparatus 902 in FIG. 9. Thus, the dormant state may be associated with a particular BWP of the SCell. The indication may be comprised in DCI from a primary cell. The indication may be comprised in DCI and/or a MAC-CE. The DCI may comprise a null assignment, for example.

In another aspect, the indication may be based on an inactivity timer. Thus, the BWP switch may be performed without receiving explicit signaling. The UE may transition the SCell to the dormant state based on the timer expiration for the PCell.

In another aspect, the indication may include an indication of a BWP switch of the primary cell, as described in connection with FIG. 6. The UE may transition at least one SCell between the active state and the dormant state based on the BWP of the PCell. In an aspect, the indication may indicate the BWP switch for the primary cell from a first BWP to a second BWP, and wherein the UE transitions from the active state to the dormant state for the SCell based on the BWP switch for the primary cell.

In an aspect, the indication may comprise DCI received from the primary cell to cause the UE to transition between the active state and the dormant state for the SCell. In another aspect, the indication may be associated with a DRX state of the UE. In another aspect, the UE may determine implicit instructions to transition to the dormant state based on another configuration for the PCell or the SCell. For example, if a search space is disabled, e.g., by a semi-persistent search space configuration, the SCell may implicitly be determined to be in the dormant state. Thus, the indication may be based on explicit signaling or may comprise an implicit indication. Receiving an indication on a primary cell or a SCell may include receiving and processing signals from a base station.

At 806, the UE transitions between an active state and a dormant state for a Secondary Cell (SCell) based on the indication of the BWP switch that was received at 804. The transition may be performed, e.g., by the transition component 908 of the apparatus 902 in FIG. 9. The UE may transition between the active state and the dormant state, e.g., as described in connection with any of FIGS. 4, 5, 6, and 7. In an aspect, the UE may infer instructions to transition to the dormant state based on another configuration for at least one of the primary cell or the SCell. Processing a transition may include receiving an indication and switching states of the UE (e.g., between active and dormant) based on the indication.

The dormant state may be associated with a BWP configured for the SCell, e.g., when the BWP configured for the SCell becomes active, the SCell is in the dormant state. The BWP may be referred to as a "dormant BWP" because it is a BWP that is associated with a dormant state for the SCell, e.g., the SCell may be in the dormant state when the dormant BWP is active. For example, the UE may receive a configuration from the base station for at least two BWPs, e.g., a BWP associated with the active state for the UE and a BWP associated with the dormant state for the UE. The dormant BWP may be configured based on at least one of an empty CORESET, an empty search space, or an empty set of search candidates in a search space. For example, a CORESET, search space, or set of search candidates might not be configured for the BWP associated with the dormant state. When the dormant BWP configured for the secondary cell becomes active, e.g., based on the BWP switch indicated by the base station, the UE transitions to the dormant state for the secondary cell. If the UE receives a BWP switch from the dormant BWP to the active BWP, the UE transitions to the active state.

A bandwidth of the dormant BWP configured for the SCell may comprise a full bandwidth of the SCell, or may comprise a partial bandwidth of the SCell.

The SCell may be self-scheduled on the SCell, and the dormant state may comprise a configuration for at least one of skipping control channel monitoring for the SCell, an increased control channel monitoring period for the SCell relative to the active state, an increased CSI measurement period for the SCell relative to the active state, an increased SRS transmission period for the SCell relative to the active state, a reduction in RRM measurement or duration relative to the active state, beam management performance based on the increased CSI measurement period relative to the active state, beam failure recovery performance through the primary cell, or an increased minimum scheduling offset relative to the active state.

In another example, the SCell may be cross-carrier scheduled, as described in connection with FIG. 7, and the dormant state may comprise a configuration for at least one of an increased control channel monitoring period for the SCell on the PCell relative to the active state, an increased CSI measurement period for the SCell relative to the active state, an increased SRS transmission period for the SCell relative to the active state, a reduction in a RRM measurement or duration relative to the active state, beam management performance based on the increased CSI measurement period relative to the active state, beam failure recovery performance through the primary cell, or an increased minimum scheduling offset relative to the active state.

In another example, the dormant state may be a sub-state of the BWP. Thus, the UE may transition to the dormant state by applying a dormant state configuration to an active BWP of the SCell. The active BWP of the SCell may comprise a first set of parameters for the active state and a second set of parameters for the dormant state. The second set of parameters may comprise a scaling factor for at least one of a control channel monitoring period, a CSI measurement period, or a SRS transmission period.

Figure 9:
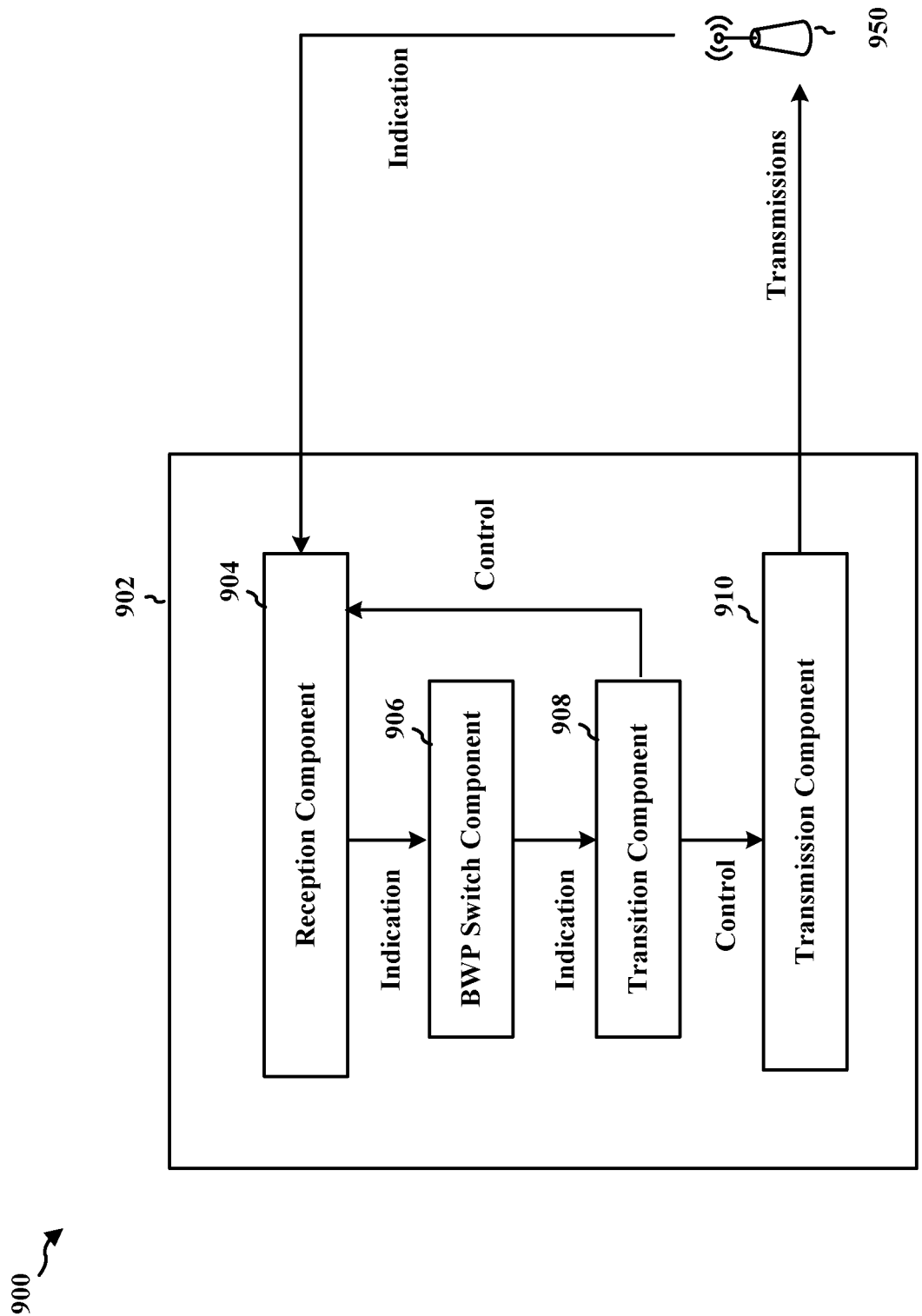
FIG. 9 is a conceptual data flow diagram illustrating the data flow between different means/components in an example apparatus.

In another example, the UE may transition to the dormant state by applying a set of parameters for the dormant state to a CC of the SCell. The set of parameters applied to the CC may comprise a scaling factor for at least one of a control channel monitoring period, a CSI measurement period, or a SRS transmission period FIG. 9 is a conceptual data flow diagram 900 illustrating the data flow between different means/components in an example apparatus 902. The apparatus may be a UE or a component of a UE (e.g., UE 104, 350). The apparatus includes a reception component 904 that may receive an indication on a primary cell or a SCell (e.g., a cell formed using base station 950), e.g., that monitors the PCell/SCell for a DCI that indicates a BWP switch. The apparatus 902 includes a BWP switch component 906 configured to receive an indication of a BWP switch for an Scell, e.g., as described in connection with 804 in FIG. 8. The apparatus includes a transition component 908 configured to control a transition between an active state and a dormant state based on the indication of the BWP switch, e.g., as described in connection with 806 in FIG. 8. The apparatus includes a transmission component 910 configured to transmit uplink signals to the base station 950. The transition component 908 may send control signals to the reception component 904 and the transmission component 910. The reception component 904 and the transmission component 910 may perform fewer functions, e.g., such as skipping control channel monitor for the SCell, etc., when the UE is in the dormant state, which may be indicated to the reception component 904 and the transmission component 910 by the control signals.

The apparatus may include additional components that perform each of the blocks of the algorithm in the aforementioned flowcharts of FIG. 8, as well as the aspects described in connection with FIGS. 4-7. As such, each block in the aforementioned flowcharts of FIG. 8, as well as the aspects described in connection with FIGS. 4-7, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
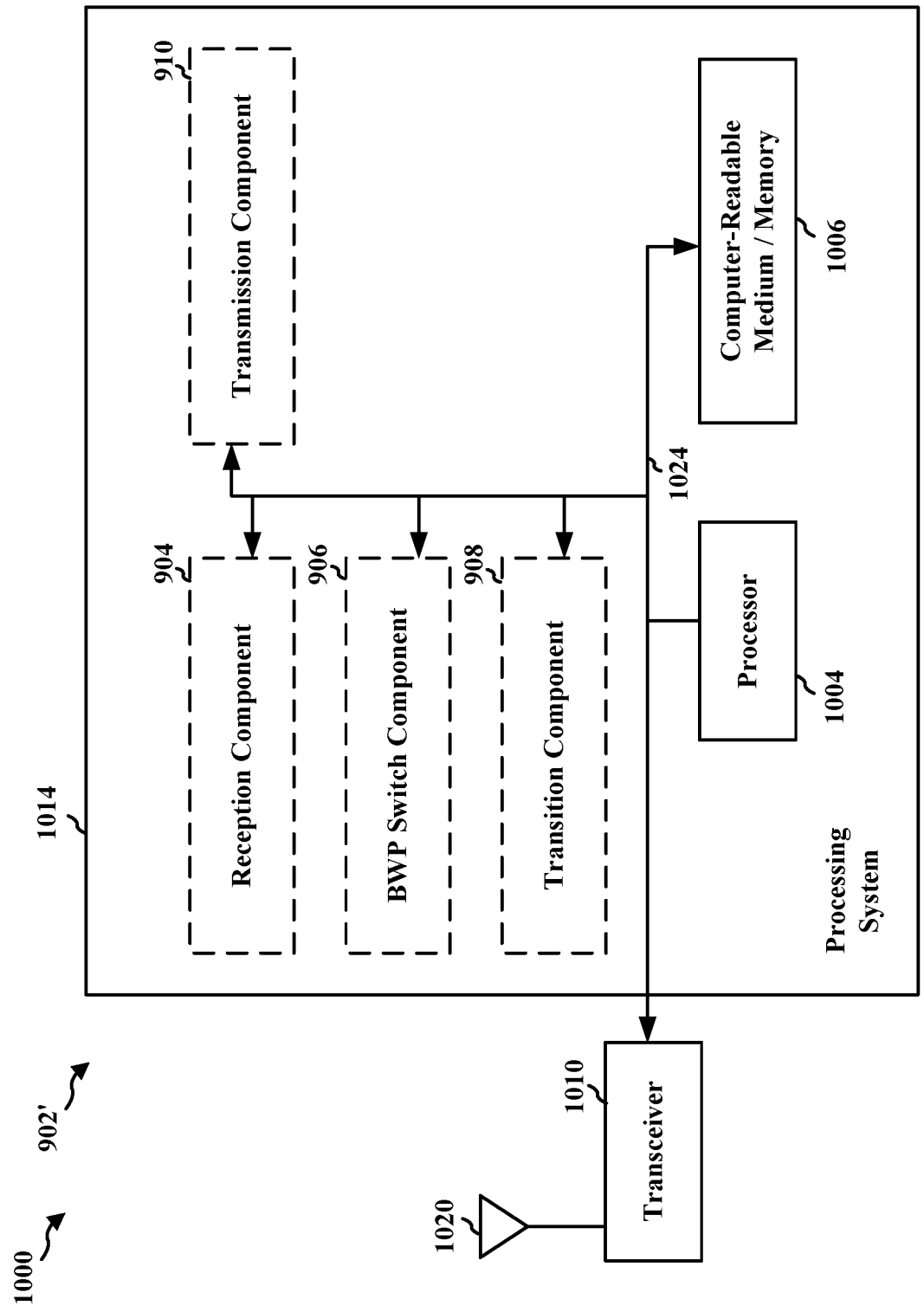
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for monitoring the SCell for a BWP switching DCI, means for receiving an indication of a BWP switch for a SCell, means for transitioning between an active state and a dormant state for a SCell based on the indication of the BWP switch. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means. Alternatively, the processing system 1014 may be the entire UE (e.g., see 350 of FIG. 3).

The means for monitoring the SCell for a BWP switching DCI may look for an indication from the means for receiving an indication on a primary cell or a SCell, receive such an indication from the means for receiving an indication on a primary cell or a SCell, and pass the indication to the transition component 908. The means for receiving an indication on a primary cell or a SCell may receive and process signals, such as an indication, from the base station 950. The means for transitioning between an active state and a dormant state for a SCell based on the indication of the primary cell or secondary cell may receive an indication from the means for monitoring the SCell for a BWP switching DCI and switch states of the UE (e.g., between active and dormant) based on the indication.

Figure 11:
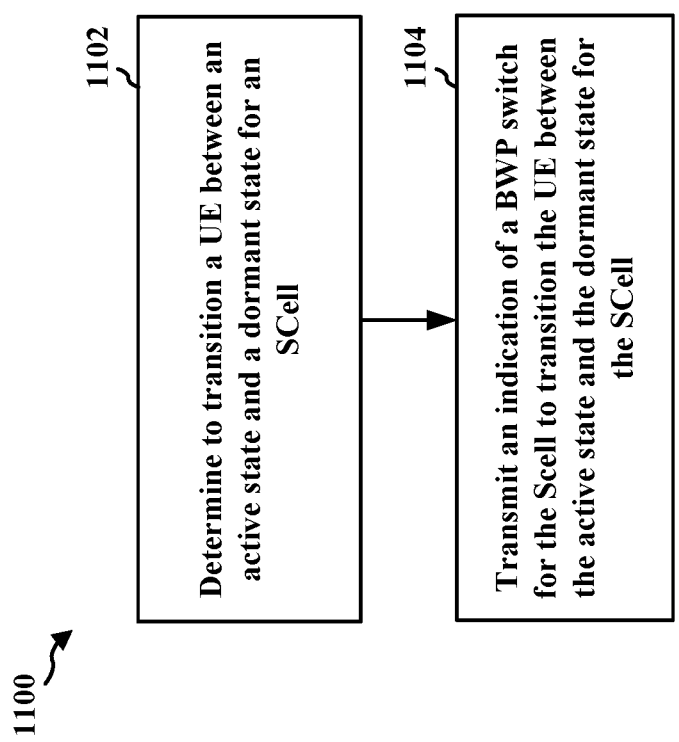
FIG. 11 is a flowchart of a method of wireless communication.

FIG. 11 is a flowchart 1100 of a method of wireless communication. The method may be performed by a base station or a component of a base station (e.g., the base station 102, 180, 310; the apparatus 1202/1202'; the processing system 1314, which may include the memory 376 and which may be the entire base station 310 or a component of the base station 310, such as the TX processor 316, the RX processor 370, and/or the controller/processor 375). The method may enable the base station to assist the UE in achieving greater efficiency and improved power savings by transitioning to a dormant state. Aspects of the method may enable the UE to transition between the active state and the dormant state in an improved manner.

At 1102, the base station determines to transition a UE between an active state and a dormant state for a secondary cell. The determination may be performed, e.g., by the determination component 1208 of the apparatus 1202 in FIG. 12. For example, the base station may determine to transition the UE to a dormant state, e.g., when the base station does not have communication for the SCell for at least a period of time. The dormant state for the secondary cell may comprise a configuration for the UE to skip control channel monitoring for the secondary cell.

At 1104, the base station transmits, to the UE, an indication of a BWP switch for the secondary cell in order to transition the UE between the active state and the dormant state for the secondary cell. The indication may be transmitted, e.g., by the BWP switching component 1210 and/or the transmission component 1206 of the apparatus 1202 in FIG. 12. The indication may be comprised in DCI transmitted on a primary cell. The DCI may comprise a null assignment. The dormant state may correspond to a dormant BWP configured for the secondary cell. For example, the base station may configure the UE for at least two BWPs, e.g., a BWP associated with the active state for the UE and a BWP associated with the dormant state for the UE. The dormant BWP may be configured based on at least one of an empty CORESET, an empty search space, or an empty set of search candidates in a search space. For example, a CORESET, search space, or set of search candidates might not be configured for the BWP associated with the dormant state. When the dormant BWP configured for the secondary cell becomes active, e.g., based on the BWP switch indicated by the base station, the UE transitions to the dormant state for the secondary cell. If the base station sends a BWP switch from the dormant BWP to the active BWP, the UE transitions to the active state.

Figure 12:
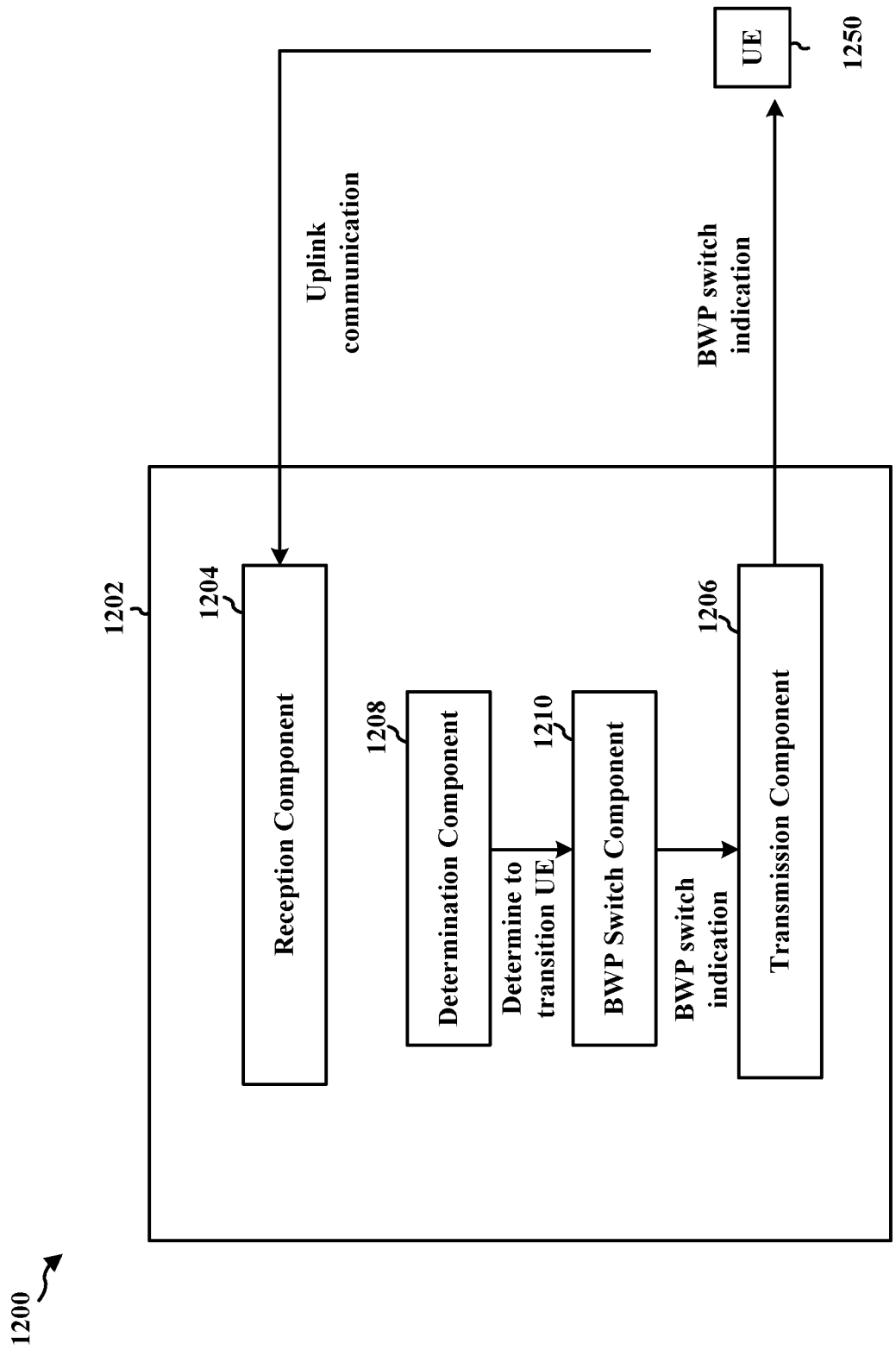
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station or a component of a base station. The apparatus includes a reception component 1204 that receives uplink communication from the UE 1250, and a transmission component 1206 that transmits downlink communication to the UE 1250. The apparatus 1202 includes a determination component 1208 configured to determine to transition the UE 1250 between an active state and a dormant state for an SCell, e.g., as described in connection with 1102 in FIG. 11. The apparatus 1202 includes a BWP switching component 1210 configured to transmit an indication of a BWP switch for the SCell in order to transition the UE between the active state and the dormant state, e.g., as described in connection with 1104 in FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
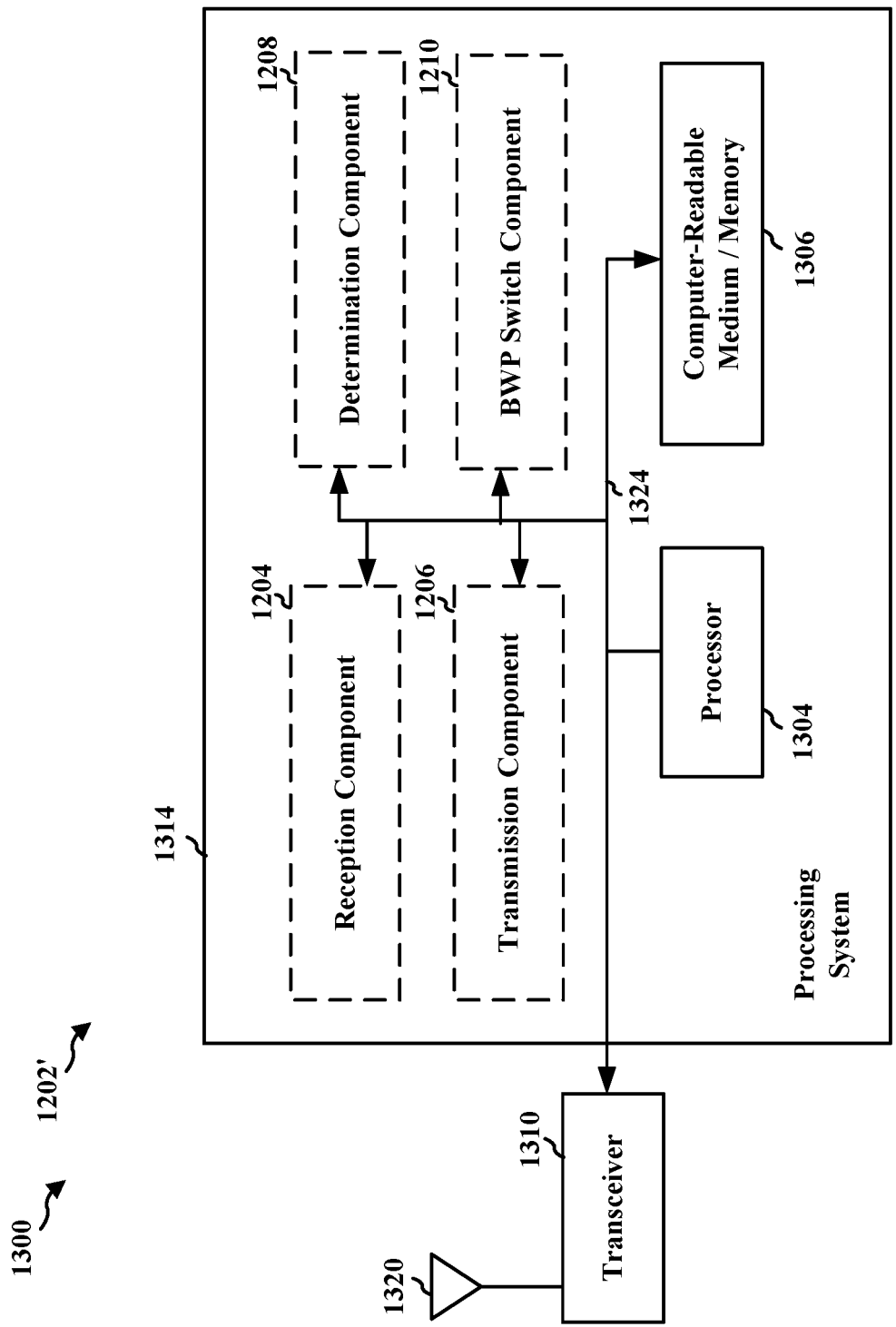
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for determining to transition a UE between an active state and a dormant state for a secondary cell and means for transmitting, to the UE, an indication of a bandwidth part (BWP) switch for the secondary cell in order to transition the UE between the active state and the dormant state for the secondary cell. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other examples or teaching described herein, without limitation.

Example 1 is a method of wireless communication at a UE, comprising: receiving an indication of a BWP switch for a secondary cell; and transitioning between an active state and a dormant state for the secondary cell based on the indication of the BWP switch.

In Example 2, the method of Example 1 further includes that the UE skips control channel monitoring for the secondary cell while in the dormant state.

In Example 3, the method of Example 1 or Example 2 further includes that the indication is comprised in DCI received from a primary cell.

In Example 4, the method of any of Examples 1-3 further includes that the downlink control information comprises a null assignment.

In Example 5, the method of any of Examples 1-4 further includes that the dormant state corresponds to a dormant BWP configured for the secondary cell.

In Example 6, the method of any of Examples 1-5 further includes that when the dormant BWP configured for the secondary cell becomes active, the secondary cell is in the dormant state.

In Example 7, the method of any of Examples 1-6 further includes that the dormant BWP is configured based on at least one of an empty CORESET, an empty search space, or an empty set of search candidates in a search space.

In Example 8, the method of any of Examples 1-7 further includes that a bandwidth of the dormant BWP configured for the secondary cell comprises a full bandwidth of the secondary cell.

In Example 9, the method of any of Examples 1-8 further includes that the indication is based on an inactivity timer.

In Example 10, the method of any of Examples 1-9 further includes that the dormant state for the secondary cell comprises a configuration for at least one of: an increased control channel monitoring period for the secondary cell relative to the active state, an increased CSI measurement period for the secondary cell relative to the active state, an increased SRS transmission period for the secondary cell relative to the active state, a reduction in RRM measurement or duration relative to the active state, beam management performance based on the increased CSI measurement period relative to the active state, beam failure recovery performance through a primary cell, or an increased minimum scheduling offset relative to the active state.

In Example 11, the method of any of Examples 1-10 further includes that the secondary cell is self-scheduled on the secondary cell.

In Example 12, the method of any of Examples 1-11 further includes that a primary cell comprises a primary cell or a PSCell.

In Example 13, the method of any of Examples 1-12 further includes that the indication further comprises an indication of a BWP switch of a primary cell from a first BWP to a second BWP, and wherein the UE transitions at least one secondary cell from the active state and the dormant state based on the BWP switch of the primary cell, and wherein when the primary cell switches from the second BWP, the UE transitions from the dormant state to the active state for the secondary cell.

In Example 14, the method of any of Examples 1-13 further includes that the secondary cell is cross-carrier scheduled using a primary cell, and wherein the dormant state for the secondary cell comprises a configuration for at least one of: an increased control channel monitoring period for the secondary cell on the primary cell relative to the active state, an increased CSI measurement period for the secondary cell relative to the active state, an increased SRS transmission period for the secondary cell relative to the active state, a reduction in a RRM measurement or duration relative to the active state, beam management performance based on the increased CSI measurement period relative to the active state, beam failure recovery performance through the primary cell, or an increased minimum scheduling offset relative to the active state.

In Example 15, the method of any of Examples 1-14 further includes that the UE transitions to the dormant state by applying a dormant state configuration to an active BWP of the secondary cell, wherein the active BWP of the secondary cell comprises a first set of parameters for the active state and a second set of parameters for the dormant state, wherein the second set of parameters comprises a scaling factor for at least one of a control channel monitoring period, a CSI measurement period, or a SRS transmission period.

In Example 16, the method of any of Examples 1-15 further includes that the UE transitions to the dormant state by applying a set of parameters for the dormant state to a component carrier of the secondary cell, and wherein the set of parameters for the dormant state comprises a scaling factor for at least one of a control channel monitoring period, a CSI measurement period, or a SRS transmission period.

In Example 17, the method of any of Examples 1-16 further includes that the indication is associated with a DRX state of the UE.

In Example 18, the method of any of Examples 1-17 further includes that the UE infers instructions to transition to the dormant state based on another configuration for at least one of a primary cell or the secondary cell.

Example 19 is a device including one or more processors and one or more memories in electronic communication with the one or more processors storing instructions executable by the one or more processors to cause the device to implement a method as in any of Examples 1-18.

Example 20 is a system or apparatus including means for implementing a method or realizing an apparatus as in any of Examples 1-18.

Example 21 is a non-transitory computer readable medium storing instructions executable by one or more processors to cause the one or more processors to implement a method as in any of Examples 1-18.

Example 22 is a method of wireless communication at a base station, comprising: determining to transition a UE between an active state and a dormant state for a secondary cell; and transmitting, to the UE, an indication of a BWP switch for the secondary cell in order to transition the UE between the active state and the dormant state for the secondary cell.

In Example 23, the method of Example 22 further includes that the dormant state for the secondary cell comprises a configuration for the UE to skip control channel monitoring for the secondary cell.

In Example 24, the method of Example 22 or Example 23 further includes that the indication is comprised in DCI transmitted on a primary cell.

In Example 25, the method of any of Examples 22-24 further includes that the downlink control information comprises a null assignment.

In Example 26, the method of any of Examples 22-25 further includes that the dormant state corresponds to a dormant BWP configured for the secondary cell.

In Example 27, the method of any of Examples 22-26 further includes that when the dormant BWP configured for the secondary cell becomes active, the UE transitions to the dormant state for the secondary cell.

In Example 28, the method of any of Examples 22-27 further includes that the dormant BWP is configured based on at least one of an empty CORESET, an empty search space, or an empty set of search candidates in a search space.

Example 29 is a device including one or more processors and one or more memories in electronic communication with the one or more processors storing instructions executable by the one or more processors to cause the device to implement a method as in any of Examples 22-28.

Example 30 is a system or apparatus including means for implementing a method or realizing an apparatus as in any of Examples 22-28.

Example 31 is a non-transitory computer readable medium storing instructions executable by one or more processors to cause the one or more processors to implement a method as in any of Examples 22-28.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a User Equipment (UE), comprising:
   a memory; and
   at least one processor coupled to the memory and configured to cause the UE to:
      receive downlink control information (DCI) comprising an indication of a bandwidth part (BWP) switch for a secondary cell to a dormant BWP; and
      transition the secondary cell from an active state to a dormant state based on the indication of the BWP switch of the secondary cell to the dormant BWP.

2. The apparatus of claim 1, wherein the at least one processor is further configured to cause the UE to:
   receive a configuration for the dormant BWP of the secondary cell.

3. The apparatus of claim 1, wherein to the at least one processor is further configured to cause the UE to:
   switch the secondary cell to the dormant BWP based on the indication.

4. The apparatus of claim 1, wherein to transition the secondary cell, the at least one processor is configured to cause the UE to transition the secondary cell individually to the dormant state.

5. The apparatus of claim 1, wherein a subset of secondary cells are configured to switch to the dormant state based on a BWP, the at least one processor being further configured to cause the UE to:
transition the subset of secondary cells to the dormant state.

6. The apparatus of claim 1, wherein the dormant state includes skipping control channel monitoring for the secondary cell.

7. The apparatus of claim 1, wherein the dormant state includes skipping downlink control channel monitoring on the secondary cell.

8. The apparatus of claim 1, wherein the dormant state is associated with a particular BWP configured for the secondary cell.

9. The apparatus of claim 8, wherein the secondary cell is in the dormant state when the particular BWP associated with the secondary cell becomes active.

10. The apparatus of claim 1, wherein the dormant state includes reduced channel state information (CSI).

11. The apparatus of claim 1, wherein the dormant state includes reduced sounding reference signal (SRS) transmission.

12. The apparatus of claim 1, further comprising:
at least one transceiver coupled to the at least one processor.

13. A method of wireless communication at a User Equipment (UE), comprising:
receiving downlink control information (DCI) comprising an indication of a bandwidth part (BWP) switch for a secondary cell to a dormant BWP; and
transitioning the secondary cell from an active state to a dormant state based on the indication of the BWP switch of the secondary cell to the dormant BWP.

14. The method of claim 13, further comprising:
receiving a configuration for the dormant BWP of the secondary cell.

15. The method of claim 13, further comprising:
switching the secondary cell to the dormant BWP based on the indication.

16. The method of claim 13, wherein transitioning the secondary cell includes transitioning the secondary cell individually to the dormant state.

17. The method of claim 13, wherein a subset of secondary cells are configured to switch to the dormant state based on a BWP, the method further comprising:
transitioning the subset of secondary cells to the dormant state.

18. The method of claim 13, wherein the dormant state includes skipping control channel monitoring for the secondary cell.

19. The method of claim 13, wherein the dormant state includes skipping downlink control channel monitoring on the secondary cell.

20. The method of claim 13, wherein the dormant state is associated with a particular BWP configured for the secondary cell.

21. The method of claim 20, wherein the secondary cell is in the dormant state when the particular BWP associated with the secondary cell becomes active.

22. The method of claim 13, wherein the dormant state includes reduced channel state information (CSI).

23. The method of claim 13, wherein the dormant state includes reduced sounding reference signal (SRS) transmission.

24. An apparatus for wireless communication at a User Equipment (UE), comprising:
means for receiving downlink control information (DCI) comprising an indication of a bandwidth part (BWP) switch for a secondary cell to a dormant BWP; and
means for transitioning the secondary cell from an active state to a dormant state based on the indication of the BWP switch of the secondary cell to the dormant BWP.

25. The apparatus of claim 24, further comprising:
means for receiving a configuration for the dormant BWP of the secondary cell.

26. The apparatus of claim 24, further comprising:
means for switching the secondary cell to the dormant BWP based on the indication.

27. The apparatus of claim 24, wherein the means for transitioning the secondary cell are configured to transition the secondary cell individually to the dormant state.

28. The apparatus of claim 24, wherein a subset of secondary cells are configured to switch to the dormant state based on a BWP, and the means for transitioning are configured to transition the subset of secondary cells to the dormant state.

29. A non-transitory computer-readable medium storing computer executable code for wireless communication at a user equipment (UE), the code when executed by at least one processor causes the UE to:
receive downlink control information (DCI) comprising an indication of a bandwidth part (BWP) switch for a secondary cell to a dormant BWP; and
transition the secondary cell from an active state to a dormant state based on the indication of the BWP switch of the secondary cell to the dormant BWP.

30. The non-transitory computer-readable medium of claim 29, wherein the code when executed by the at least one processor further causes the UE to:
receive a configuration for the dormant BWP of the secondary cell.

* * * * *